(12) United States Patent
Park et al.

(10) Patent No.: US 10,418,634 B2
(45) Date of Patent: Sep. 17, 2019

(54) CATHODE ACTIVE MATERIAL FOR LITHIUM SECONDARY BATTERIES SURFACE-TREATED WITH FLUORINE COPOLYMER AND METHOD OF MANUFACTURING THE SAME

(71) Applicant: LG Chem, Ltd., Seoul (KR)

(72) Inventors: Byung Chun Park, Daejeon (KR); Wang Mo Jung, Daejeon (KR); Sang Seung Oh, Daejeon (KR); Sungbin Park, Daejeon (KR); Ji Hye Kim, Daejeon (KR)

(73) Assignee: LG Chem, Ltd. (KR)

(*) Notice: Subject to any disclaimer, the term of this patent is extended or adjusted under 35 U.S.C. 154(b) by 710 days.

(21) Appl. No.: 15/032,178

(22) PCT Filed: Nov. 7, 2014

(86) PCT No.: PCT/KR2014/010651
§ 371 (c)(1),
(2) Date: Apr. 26, 2016

(87) PCT Pub. No.: WO2015/072702
PCT Pub. Date: May 21, 2015

(65) Prior Publication Data
US 2016/0260979 A1    Sep. 8, 2016

(30) Foreign Application Priority Data
Nov. 18, 2013    (KR) .................. 10-2013-0139776

(51) Int. Cl.
*H01M 4/62*    (2006.01)
*H01M 4/505*    (2010.01)
(Continued)

(52) U.S. Cl.
CPC ......... *H01M 4/628* (2013.01); *H01M 2/1653* (2013.01); *H01M 4/0404* (2013.01);
(Continued)

(58) Field of Classification Search
CPC .... H01M 4/1315; H01M 4/485; H01M 4/582; H01M 4/602; H01M 4/62; H01M 4/661;
(Continued)

(56) References Cited

U.S. PATENT DOCUMENTS 9,455,444 B2 * 9/2016 Watanabe ............. H01M 4/525
2003/0086863 A1    5/2003 Noguchi et al.
(Continued)

FOREIGN PATENT DOCUMENTS

CN    1729591 A    2/2006
JP    2008251434 A    10/2008
(Continued)

OTHER PUBLICATIONS

L. Croguennec et al., Synthesis of Li [sub 0.45] Mn [sub 0.425] Co [sub 0.15]) [sub 0.9]0[sub 1.8]F[sub 0.2], Materials by Different Routes Is there Flourine Substitution for Oxygen?, Journal of Electrochemical Society, vol. 156, No. 5, p. A349 to A355, Feb. 25, 2009.
(Continued)

*Primary Examiner* — Golam Mowla
(74) *Attorney, Agent, or Firm* — Lerner, David, Littenberg, Krumholz & Mentlik, LLP

(57) ABSTRACT

Disclosed are a cathode active material for lithium secondary batteries including lithium-containing metal oxide particles; a first surface treatment layer formed on the surfaces of the lithium-containing metal oxide particles and including at least one compound selected from the group consisting of fluorine-doped metal oxides and fluorine-doped metal hydroxides; and a second surface treatment layer formed on
(Continued)

a surface of the first surface treatment layer and including a fluorine copolymer, and a method of manufacturing the same.

21 Claims, 1 Drawing Sheet

(51) Int. Cl.

| | |
|---|---|
| H01M 4/525 | (2010.01) |
| H01M 4/1315 | (2010.01) |
| H01M 4/36 | (2006.01) |
| H01M 4/485 | (2010.01) |
| H01M 2/16 | (2006.01) |
| H01M 4/04 | (2006.01) |
| H01M 4/131 | (2010.01) |
| H01M 4/1391 | (2010.01) |
| H01M 4/38 | (2006.01) |
| H01M 4/66 | (2006.01) |
| H01M 10/0525 | (2010.01) |
| H01M 10/0568 | (2010.01) |
| H01M 10/0569 | (2010.01) |
| H01M 10/0585 | (2010.01) |
| H01M 4/58 | (2010.01) |
| H01M 4/60 | (2006.01) |
| H01M 4/02 | (2006.01) |

(52) U.S. Cl.
CPC ......... *H01M 4/131* (2013.01); *H01M 4/1315* (2013.01); *H01M 4/1391* (2013.01); *H01M 4/366* (2013.01); *H01M 4/382* (2013.01); *H01M 4/485* (2013.01); *H01M 4/505* (2013.01); *H01M 4/525* (2013.01); *H01M 4/661* (2013.01); *H01M 10/0525* (2013.01); *H01M 10/0568* (2013.01); *H01M 10/0569* (2013.01); *H01M 10/0585* (2013.01); *C01P 2006/40* (2013.01); *H01M 4/582* (2013.01); *H01M 4/602* (2013.01); *H01M 4/62* (2013.01); *H01M 2004/021* (2013.01); *H01M 2004/027* (2013.01); *H01M 2004/028* (2013.01); *H01M 2220/20* (2013.01); *H01M 2300/004* (2013.01)

(58) Field of Classification Search
CPC ...... H01M 4/628; H01M 4/505; H01M 4/525; H01M 4/382; H01M 4/1391; H01M 4/131; H01M 4/0404; H01M 4/366; H01M 2004/027; H01M 2004/028; H01M 2004/021; H01M 2300/004; H01M 10/0585; H01M 10/0569; H01M 10/0568; H01M 10/0525; H01M 2/1653
See application file for complete search history.

(56) References Cited

U.S. PATENT DOCUMENTS

| | | | |
|---|---|---|---|
| 2004/0121234 A1 | 6/2004 | Le | |
| 2007/0057254 A1* | 3/2007 | Mishima | H01L 51/005 257/40 |
| 2008/0254368 A1 | 10/2008 | Ooyama et al. | |
| 2009/0263707 A1* | 10/2009 | Buckley | H01M 2/1653 429/94 |
| 2011/0111298 A1 | 5/2011 | Lopez et al. | |
| 2012/0027104 A1 | 2/2012 | Bas et al. | |
| 2012/0261610 A1 | 10/2012 | Paulsen et al. | |
| 2012/0270104 A1 | 10/2012 | Paulsen et al. | |
| 2014/0110641 A1 | 4/2014 | Murotani et al. | |

FOREIGN PATENT DOCUMENTS

| | | |
|---|---|---|
| JP | 2011008950 A | 1/2011 |
| JP | 2013510392 A | 3/2013 |
| JP | 2013511129 A | 3/2013 |
| KR | 100479900 B1 | 3/2005 |
| KR | 20050114516 A | 12/2005 |
| KR | 100797099 B1 | 1/2008 |
| KR | 20130005823 A | 1/2013 |
| KR | 20130014241 A | 2/2013 |
| KR | 101244050 B1 | 3/2013 |
| KR | 20130084362 A | 7/2013 |
| WO | 2012176901 A1 | 12/2012 |

OTHER PUBLICATIONS

Supplementary European Search Report for EP Application 14861667.5 dated Jan. 1, 2017.
International Search Report from PCT/KR2014/010651, dated Feb. 16, 2016.
Baggetto, L., et al., Surface chemistry of metal oxide coated lithium manganese nickel oxide thin film cathodes studies by XPS, Electrochmicica Acta, Dec. 5, 2012, vol. 90, pp. 135-147.

* cited by examiner

[Fig. 1]
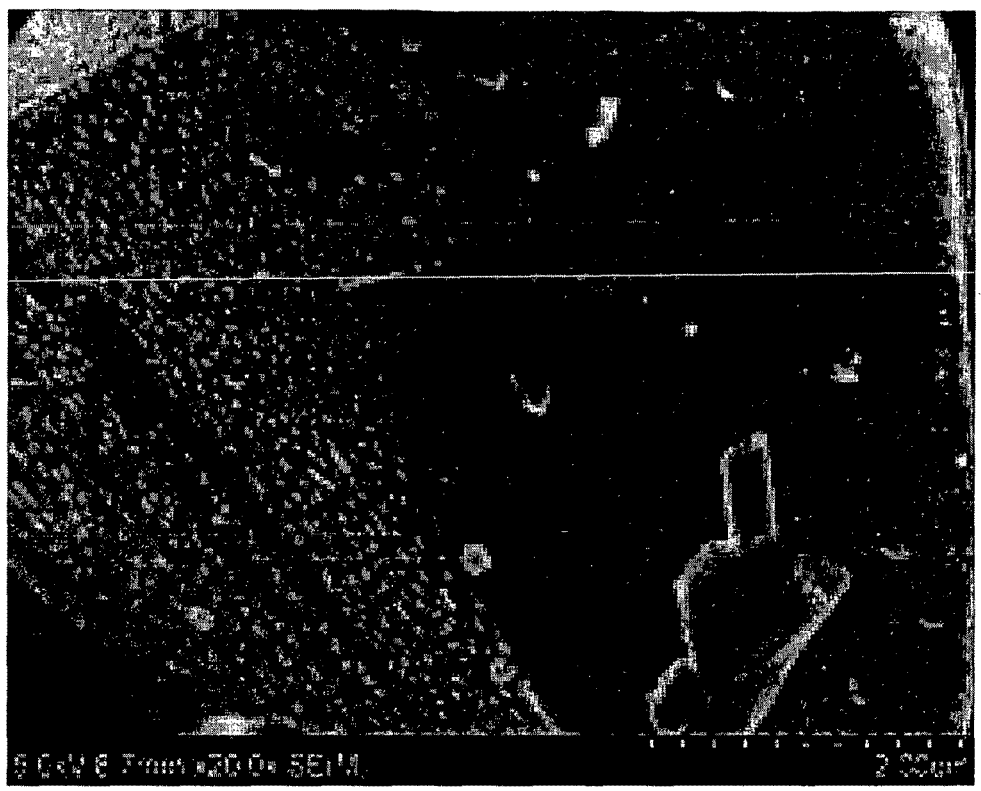
[Fig. 2]

CATHODE ACTIVE MATERIAL FOR LITHIUM SECONDARY BATTERIES SURFACE-TREATED WITH FLUORINE COPOLYMER AND METHOD OF MANUFACTURING THE SAME

CROSS-REFERENCE TO RELATED APPLICATION

This application is a national phase entry under 35 U.S.C. § 371 of International Application No. PCT/KR2014/010651, filed Nov. 7, 2014, which claims priority to Korean Patent Application No. 10-2013-0139776, filed Nov. 18, 2013, the disclosures of which are incorporated herein by reference.

TECHNICAL FIELD

The present invention relates to a cathode active material, which may be repeatedly charged and discharged, for lithium secondary batteries and a method of manufacturing the same.

BACKGROUND ART

In line with development of information technology (IT), various portable information and communication devices have entered widespread use and thus the $21^{st}$ century is developing into a "ubiquitous society" where high quality information services are available regardless of time and place. Lithium secondary batteries play a key role in such development towards the ubiquitous society. Lithium secondary batteries have higher operating voltage and energy density, are used for a longer period of time than other secondary batteries and thus can satisfy sophisticated requirements according to diversification and increasing complexity of devices. Recently, attempts to improve existing lithium secondary battery technology are actively underway around the world such that the existing lithium secondary batteries can be applied to eco-friendly hydrogen systems such as electric vehicles and the like, power storage systems, and the like.

Korean Application Pub. No. 10-2005-0114516 discloses a cathode active material for lithium secondary batteries including a lithium-containing composite oxide, a surface of which is coated with heterogeneous metal oxides.

Korean Patent No. 10-0479900 discloses a lithium-containing transition metal oxide having a spinel structure, in which some manganese (Mn) is substituted with at least one metal element selected from the group consisting of Ni, Co, Fe, Cr and Cu, and at least one metal element selected from the group consisting of silicon (Si) and titanium (Ti).

DISCLOSURE

Technical Problem

The present invention aims to provide a cathode active material for lithium secondary batteries having a novel structure different from the cathode active material introduced in Korean Application Pub. No. 10-2005-0114516 by treating surfaces of lithium-containing metal oxide particles with a fluorine copolymer.

In addition, inventors of the present application confirmed that the compound introduced in Korean Patent No. 10-0479900, wherein some manganese of a lithium-containing manganese oxide having a spinel structure was substituted with metal such as nickel and the like, has a high operating potential and, as such, an electrolytic solution is decomposed even in a normal operating range of a battery and battery performance is deteriorated due to side reaction with an electrolytic solution. In addition, elution of Mn ions was confirmed. Such problems were not observed in $LiMn_2O_4$ having an operating voltage of around 4 V. To address the above problems, in the present invention, a surface of a lithium-containing metal oxide having a spinel structure is treated with a fluorine copolymer.

Technical Solution

A cathode active material for lithium secondary batteries according to non-limiting embodiments of the present invention includes lithium-containing metal oxide particles; a first surface treatment layer formed on the surfaces of lithium-containing metal oxide particles, and including at least one compound selected from the group consisting of fluorine-doped metal oxides and fluorine-doped metal hydroxides; and a second surface treatment layer formed on a surface of the first surface treatment layer and including a fluorine copolymer.

The cathode active material according to the present invention includes a first surface treatment layer and a second surface treatment layer, each of which includes fluorine, and, in particular, may increase the concentration of lithium ions in a cathode active material surface by electrochemical reaction of a fluorine copolymer (—CF) mainly existing in the second surface treatment layer and thereby movement of lithium ions occurring during charge and discharge on a surface of a lithium-containing metal oxide may be more easily performed. As a result, side reaction of a cathode active material surface and an electrolytic solution, and elution of manganese, at high voltage, may be suppressed and thereby a high voltage lithium secondary battery may be provided.

The first surface treatment layer may entirely cover the surfaces of lithium-containing metal oxide particles, and the second surface treatment layer may partially or entirely cover a surface of the first surface treatment layer. In addition, when the first surface treatment layer partially covers a surface of the lithium-containing metal oxide, the second surface treatment layer may partially cover a surface of the lithium-containing metal oxide and may partially or entirely cover a surface of the first surface treatment layer.

According to non-limiting embodiments of the present invention, the cathode active material may be prepared by mixing the lithium-containing metal oxide particles with the fluorine copolymer in an amount of 0.05 wt % or more and less than 5.00 wt % based on the total weight of the cathode active material, and heat-treating in the atmosphere. In this case, the fluorine-doped metal oxide may be a fluorine-doped lithium-containing metal oxide wherein some oxygen of the lithium-containing metal oxide is substituted with fluorine. The amount of the fluorine copolymer may be particularly 0.05 wt % or more and 3 wt % or less, more particularly 0.10 wt % or more and less than 1.00 wt %, even more particularly 0.20 wt % or more and less than 1.00 wt %, based on the total weight of the cathode active material.

Referring to a specific experimental example of the present invention, it can be confirmed that, when the amount of the fluorine copolymer is less than 0.05 wt %, desired effects are not exhibited, and, when the amount of the fluorine copolymer is 5.00 wt % or more, initial discharge capacity and high-temperature lifespan characteristics at 45□ are reduced and self discharge increases due to gas generated during high-temperature storage of 45□.

Therefore, the cathode active material according to the present invention has critical effects when the amount of the fluorine copolymer is 0.05 wt % or more and less than 5.00 wt % based on the total weight of the cathode active material.

The fluorine-doped metal oxide may exist on the surfaces of lithium-containing metal oxide particles in a particle form. In addition, the fluorine copolymer may exist in a surface of the first surface treatment layer in a particle form (See SEM images of FIGS. 1 and 2). In this case, an average particle diameter (D50) of the fluorine-doped lithium-containing metal oxide particle may be within an average thickness range of the first surface treatment layer and an average particle diameter (D50) of the fluorine copolymer particles may be within an average thickness range of the second surface treatment layer.

In particular, each of average particle diameters (D50) of the fluorine-doped metal oxide particles and the fluorine-doped metal hydroxide particles may be, for example, 1 nm or more and less than 1500 nm, particularly, 10 nm or more and 1000 nm or less within the range described above. When each of the average particle diameters (D50) of the fluorine-doped metal oxide particles and the fluorine-doped metal hydroxide particles is less than 1 nm, the particles may be disadvantageously coagulated in excessively small sizes. On the other hand, when each of the average particle diameters (D50) of the fluorine-doped metal oxide particles and the fluorine-doped metal hydroxide particles is 1500 nm or more, efficiency of a preparation process may be disadvantageously reduced.

In non-limiting embodiments of the present invention, the cathode active material may be prepared by mixing the lithium-containing metal oxide particles with 0.05 wt % to 2.00 wt % of a metal oxide, a metal hydroxide or a mixture thereof based on the total weight of the cathode active material, and 0.05 wt % or more and less than 5.00 wt % of a fluorine copolymer based on the total weight of the cathode active material, and heat-treating in the atmosphere.

In this case, in the fluorine-doped metal oxide, some oxygen of an oxide of a metal selected from the group consisting of Al, Mg, Ni, Co, Ti, Cr, Mo, Bi, Zn, Zr, Ru and W may be substituted with fluorine, and in the fluorine-doped metal hydroxide, some hydroxyl groups of an hydroxide of one metal selected from the group consisting of Al, Mg, Ni, Co, Ti, Cr, Mo, Bi, Zn, Zr, Ru and W may be substituted with fluorine.

The amount of the fluorine-doped metal oxide based on the total weight of the cathode active material may be 0.05 wt % or more and less than 2.00 wt %, and the amount of the fluorine-doped metal hydroxide may be 0.05 wt % or more and less than 2.00 wt % based on the total weight of the cathode active material.

The amount of the fluorine copolymer may be 0.05 wt % or more and less than 5.00 wt %, particularly 0.05 wt % or more and 3 wt % or less, more particularly 0.10 wt % or more and less than 1.00 wt %, even more particularly 0.20 wt % or more and less than 1.00 wt %, based on the total weight of the cathode active material.

Referring to a specific experimental example of the present invention, it can be confirmed that, when the amount of the fluorine copolymer is less than 0.05 wt %, desired effects are not exhibited, and, when the amount of the fluorine copolymer is 5.00 wt % or more, initial discharge capacity and high-temperature lifespan characteristics at 45□ are reduced and self discharge increases due to gas generated during high-temperature storage at 45□.

Therefore, in the cathode active material according to the present invention, when the amount of the fluorine copolymer is 0.05 wt % or more and less than 5.00 wt % based on the total weight of the cathode active material, critical effects are exhibited.

The fluorine-doped metal oxide and the fluorine-doped metal hydroxide may exist on the surfaces of lithium-containing metal oxide particles in a particle form. In addition, the fluorine copolymer may exist in a surface of the first surface treatment layer in a particle form. In this case, each of the average particle diameters (D50) of the fluorine-doped metal oxide particles and the fluorine-doped metal hydroxide particles maybe within an average thickness range of the first surface treatment layer, and an average particle diameter (D50) of the fluorine copolymer particles may be an average thickness range of the second surface treatment layer.

In particular, each of the average particle diameters (D50) of the fluorine-doped metal oxide particles and the fluorine-doped metal hydroxide particles may be, for example, 1 nm or more and less than 1500 nm, more particularly 10 nm or more and 1000 nm or less, within the ranges described above. When each of the average particle diameters (D50) of the fluorine-doped metal oxide particles and the fluorine-doped metal hydroxide particles is less than 1 nm, the particles may disadvantageously coagulate in excessively small sizes. On the other hand, when each of the average particle diameters (D50) of the fluorine-doped metal oxide particles and the fluorine-doped metal hydroxide particles is 1500 nm or more, efficiency of a preparation process is disadvantageously reduced.

The present invention functions as a fluorine supply source of the metal oxide or the metal hydroxide in which the fluorine copolymer constitutes the first surface treatment layer thereof.

The fluorine copolymer may be at least one selected from the group consisting of, polyvinylfluoride, polyvinylidene fluoride, polytetrafluoroethylene, polychlorotrifluoroethylene, perfluoroalkoxy polymer, fluorinated ethylene-propylene, polyethylenetetrafluoroethylene, polyethylenechlorotrifluoroethylene, perfluoroelastomer, fluorocarbon, perfluoropolyether, and perfluorosulfonic acid, but the present invention is not limited thereto.

The lithium-containing metal oxide may be a lithium transition metal oxide having a layered structure or a lithium transition metal oxide having a spinel structure. Examples of the lithium-containing metal oxide include layered compounds such as lithium cobalt oxide ($LiCoO_2$) and lithium nickel oxide ($LiNiO_2$), or compounds substituted with one or more transition metals; lithium manganese oxides such as compounds of Formula $Li_{1+y}Mn_{2-y}O_4$ where $0 \leq y \leq 0.33$, $LiMnO_3$, $LiMn_2O_3$, and $LiMnO_2$; lithium copper oxide ($Li_2CuO_2$); Ni-site type lithium nickel oxides having the formula $LiNi_{1-y}M_yO_2$ where M=Co, Mn, Al, Cu, Fe, Mg, B, or Ga, and $0.01 \leq y \leq 0.3$; or lithium manganese composite oxides having the formula $LiMn_{2-y}M_yO_2$ where M=Co, Ni, Fe, Cr, Zn, or Ta, and $0.01 \leq y \leq 0.1$ or the formula $Li_2Mn_3MO_8$ where M=Fe, Co, Ni, Cu, or Zn. As a specific embodiment, the lithium transition metal oxide having a spinel structure may be a compound having a composition represented by Formula 1 below:

$$Li_{1+a}M_xMn_{2-x}O_4 \tag{1}$$

wherein M may be at least one selected from the group consisting of Ni, Ti, Co, Al, Cu, Fe, Mg, B, Cr, Zn and Period 5 transition metals; −0.1≤a≤0.1; and 0.3≤x≤0.8.

More particularly, the lithium transition metal oxide having a spinel structure Formula of 1 may be a compound having a composition represented by Formula 2 below:

$$Li_{1+a}Ni_bM_cMn_{2-(b+c)}O_4 \quad (2)$$

wherein M may be at least one selected from the group consisting of Ti, Co, Al, Cu, Fe, Mg, B, Cr, Zn and Period 5 transition metals; −0.1≤a≤0.1; 0.3≤b≤0.6; and 0≤c≤0.2.

In addition, the present invention may provide a cathode for lithium secondary batteries including an electrode mixture layer including the cathode active material, a conductive material and a binder coated on a current collector.

In addition, the present invention may provide a lithium secondary battery manufactured by sealing after embedding an electrode assembly including a cathode, an anode, and a copolymer layer interposed between the cathode and the anode into a battery case. The lithium secondary battery may include a lithium salt-containing non-aqueous electrolyte. The lithium secondary battery may be a lithium ion battery, a lithium ion polymer battery, and a lithium polymer battery.

The cathode or the anode may be fabricated using a manufacturing method including: preparing a binder solution by dispersing or dissolving a binder in a solvent; preparing an electrode slurry by mixing the binder solution with an electrode active material and a conductive material; coating the electrode slurry onto a current collector; drying the electrode; and compressing the electrode to a certain thickness. In some cases, the method may further include drying the compressed electrode.

The preparing of the binder solution is a process of preparing a binder solution by dispersing or dissolving a binder in a solvent.

The binder may be all binders known in the art and, in particular, may be one selected from the group consisting of fluorine resin-based binders including polyvinylidene fluoride (PVdF) or polytetrafluoroethylene (PTFE), rubber-based binders including styrene-butadiene rubber, acrylonitrile-butadiene rubber, or styrene-isoprene rubber, cellulose-based binders including carboxymethylcellulose (CMC), starch, hydroxypropylcellulose, or regenerated cellulose, polyalcohol-based binders, polyolefin-based binders including polyethylene or polypropylene, polyimide-based binders, polyester-based binders, a mussel adhesive, and silane-based binders or a mixture or copolymer of at least two of the above-listed binders.

The solvent may be selectively used according to kind of a binder, e.g., an organic solvent such as isopropyl alcohol, N-methylpyrrolidone (NMP), acetone, or the like, water, or the like.

In a specific embodiment, a binder solution for cathodes may be prepared by dispersing or dissolving PVdF in NMP, and a binder solution for anodes may be prepared by dispersing or dissolving styrene-butadiene rubber (SBR)/carboxymethylcellulose (CMC) in water.

An electrode slurry may be prepared by mixing/dispersing an electrode active material and a conductive material in the binder solution. The prepared electrode slurry may be transferred using a storage tank and stored prior to use in a coating process. To prevent the electrode slurry from becoming hard, the electrode slurry may be continuously stirred in the storage tank.

The electrode active material may be the cathode active material described above or an anode active material described below. Examples of the anode active material include carbon such as hard carbon and graphite-based carbon; metal composite oxides such as $Li_xFe_2O_3$ where $0≤x≤1$, $Li_xWO_2$ where $0≤x≤1$, $Sn_xMe_{1-x}Me'_yO_z$ where Me: Mn, Fe, Pb, or Ge; Me': Al, B, P, Si, Group I, Group II and Group III elements, or halogens; $0≤x≤1$; $1≤y≤3$; and $1≤z≤8$; lithium metal; lithium alloys; Si-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; and Li—Co—Ni-based materials.

The conductive material is not particularly limited so long as it has conductivity and does not cause chemical changes in the fabricated battery. Examples of conductive materials include graphite such as natural or artificial graphite; carbon black such as carbon black, acetylene black, Ketjen black, channel black, furnace black, lamp black, and thermal black; conductive fibers such as carbon fibers and metallic fibers; metallic powders such as carbon fluoride powder, aluminum powder, and nickel powder; conductive whiskers such as zinc oxide and potassium titanate; conductive metal oxides such as titanium oxide; and polyphenylene derivatives.

The electrode slurry may further optionally include a filler or the like, as desired. The filler is not particularly limited so long as it is a fibrous material that does not cause chemical changes in the fabricated battery. Examples of the filler include olefin-based polymers such as polyethylene and polypropylene; and fibrous materials such as glass fiber and carbon fiber.

The coating of the electrode slurry is a process of coating the electrode slurry on a current collector in a predetermined pattern and to a uniform thickness by passing through a coater head.

Coating of the electrode slurry may be performed by applying the electrode slurry to the current collector and uniformly dispersing the electrode slurry thereon using a doctor blade. In another embodiment, the coating process may be performed by die-casting, comma coating, screen-printing, or the like. In another embodiment, the electrode slurry may be molded on a separate substrate and then adhered to a current collector via pressing or lamination.

The current collector is not particularly limited so long as it does not cause chemical changes in the fabricated secondary battery and has high conductivity. For example, the current collector may be made of copper, stainless steel, aluminum, nickel, titanium, sintered carbon, copper or stainless steel surface-treated with carbon, nickel, titanium, silver, or the like, or aluminum-cadmium alloys. A cathode current collector may have fine irregularities at a surface thereof to increase adhesion between a cathode active material and the cathode current collector and be used in any of various forms including films, sheets, foils, nets, porous structures, foams, and non-woven fabrics. In particular, the cathode current collector may be a metal current collector, e.g., an Al current collector, and an anode current collector may be a metal current collector, e.g., a Cu current collector. The electrode current collector may be metal foil, e.g., Al foil or Cu foil.

The drying process is a process of removing solvent and moisture from the electrode slurry to dry the electrode slurry coated on the metal current collector. In a specific embodiment, the drying process is performed in a vacuum oven at 50 to 200° C. for one day or less.

To increase capacity density of the coating-completed electrode and to increase adhesion between the current collector and the corresponding active material, the electrode may be compressed to a desired thickness by passing between two high-temperature rolls. This process is referred to as a rolling process.

Before passing between the two high-temperature rolls, the electrode may be subjected to a preheating process. The preheating process is a process of preheating the electrode before passing between the rolls in order to enhance compression effects of the electrode.

The rolling-completed electrode may be dried in a vacuum oven at 50 to 200° C. for one day or less, within a temperature range that is equal to or greater than a melting point of the binder. The rolled electrode may be cut to a uniform length and then dried.

After the drying process, a cooling process may be performed.

The copolymer layer serves to separate the cathode from the anode and, when a solid electrolyte such as a polymer or the like is used as an electrolyte, the solid electrolyte may also act as a separator.

As the separator, an insulating thin film having high ion permeability and mechanical strength is used. The separator typically has a pore diameter of 0.01 to 10 µm and a thickness of 5 to 300 µm.

As the separator, sheets or non-woven fabrics, made of an olefin polymer such as polypropylene, glass fibers or polyethylene, which have chemical resistance and hydrophobicity, or Kraft paper are used. Examples of commercially available separators include, but are not limited to, Celgard® series such as Celgard® 2400 and 2300 (available from Hoechest Celanese Corp.), polypropylene separators (available from Ube Industries Ltd., or Pall RAI Co.), and polyethylene series (available from Tonen or Entek).

In some cases, to enhance battery stability, a gel polymer electrolyte may be coated on the separator. Examples of such gel polymers include, but are not limited to, polyethylene oxide, polyvinylidenefluoride, and polyacrylonitrile.

Examples of the electrode assembly include a jelly-roll type electrode assembly (or a winding-type electrode assembly), a stack-type electrode assembly, a stacked/folded electrode assembly, and the like, which are known in the art.

As used herein, the stacked/folded electrode assembly may be understood to include stacked/folded electrode assemblies manufactured by arranging a unit cell having a structure in which a separator is disposed between a cathode and an anode on a separator sheet and folding or winding the separator sheet.

As the non-aqueous electrolyte, a non-aqueous electrolytic solution, a solid electrolyte, an inorganic solid electrolyte or the like may be used.

For example, the non-aqueous electrolytic solution may be an aprotic organic solvent such as N-methyl-2-pyrrolidone, propylene carbonate, ethylene carbonate, butylene carbonate, dimethyl carbonate, diethyl carbonate, ethylmethyl carbonate, gamma-butyrolactone, 1,2-dimethoxy ethane, 1,2-diethoxy ethane, tetrahydrofuran, 2-methyl tetrahydrofuran, dimethylsulfoxide, 1,3-dioxolane, 4-methyl-1,3-dioxene, diethylether, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate, or the like.

Examples of the organic solid electrolyte include polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

Examples of the inorganic solid electrolyte include nitrides, halides and sulfates of lithium (Li) such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, and $Li_3PO_4$—$Li_2S$—$SiS_2$.

The lithium salt is a material that is readily soluble in the non-aqueous electrolyte. Examples thereof include $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $LiSCN$, $LiC(CF_3SO_2)_3$, $(CF_3SO_2)_2NLi$, chloroborane lithium, lower aliphatic carboxylic acid lithium, lithium tetraphenyl borate, and imides.

In addition, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the non-aqueous electrolyte. In some cases, in order to impart incombustibility, the electrolyte may further include a halogen-containing solvent such as carbon tetrachloride and ethylene trifluoride. In addition, in order to improve high-temperature storage characteristics, the electrolyte may further include carbon dioxide gas, fluoro-ethylene carbonate (FEC), propene sultone (PRS), fluoro-propylene carbonate (FPC), or the like.

The lithium secondary battery according to the present invention may be used as a power source of small devices and may also be used as a unit cell in a medium and large battery module including a plurality of lithium secondary batteries. In addition, the present invention provides a battery pack including the battery module as a power source of the medium and large devices, and examples of the medium and large devices include, but are not limited to, electric vehicles (EVs), hybrid electric vehicles (HEVs), and plug-in hybrid electric vehicles (PHEVs); and power storage devices.

The battery module and the battery pack may be manufactured according to a structure and a manufacturing method publicly known in the art, but the present invention is not specifically limited.

BRIEF DESCRIPTION OF THE DRAWINGS

The above and other objects, features and other advantages of the present invention will be more clearly understood from the following detailed description taken in conjunction with the accompanying drawing, in which:

FIG. 1 illustrates an SEM image of an SEM image of a cathode active material according to Example 1, to which the present invention is not limited; and FIG. 2 illustrates an SEM image of an SEM image of a cathode active material according to Comparative Example 1, to which the present invention is not limited.

BEST MODE

Now, the present invention will be described in more detail with reference to the following examples. These examples are provided only for illustration of the present invention and should not be construed as limiting the scope and spirit of the present invention.

Example 1

A mixture of $LiNi_{0.44}Mn_{1.56}O_4$ as a cathode and 0.2 wt % of PVdF (Kynar® FLEX) was mixed for 1 hour at 1000 rpm using a paint shaker (Red Devil, 1400 model). A mixed product was heat-treated for 5 hours at 300□ in an electric furnace in the atmosphere to prepare a cathode active material surface-treated with a fluorine copolymer.

The cathode active material, conductive material and a binder in a weight ratio of 95:2.5:2.5 were added to NMP and then mixed to prepare a cathode mixture. Subsequently, the prepared cathode mixture was coated on aluminum foil having a thickness of 20 μm and then pressed and dried, resulting in preparation of a cathode.

The cathode for lithium secondary batteries as described above, a lithium metal film as a counter electrode (an anode), as a separator, a polyethylene layer (Celgard, thickness: 20 μm), and an electrolytic solution in which 1 M $LiPF_6$ is dissolved in a mixture of ethylene carbonate, dimethylene carbonate and diethyl carbonate mixed in a ratio of 1:2:1 as a solvent were used to manufacture a 2016 coin battery.

Example 2

A 2016 coin battery was manufactured in the same manner as in Example 1, except that the amount of PVdF is 0.5 wt %.

Example 3

A 2016 coin battery was manufactured in the same manner as in Example 1, except that the amount of PVdF is 1.0 wt %.

Example 4

A 2016 coin battery was manufactured in the same manner as in Example 1, except that $LiNi_{0.44}Mn_{1.56}O_4$ as a cathode material, 0.5 wt % of PVdF, and 0.25 wt % of $Al_2O_3$ having a size of 70 nm were mixed.

Example 5

A 2016 coin battery was manufactured in the same manner as in Example 1, except that 0.25 wt % of ZrO having a size of 70 nm, instead of $Al_2O_3$, was mixed.

Example 6

A 2016 coin battery was manufactured in the same manner as in Example 1, except that 0.25 wt % of $TiO_2$ having a size of 70 nm, instead of $Al_2O_3$, was mixed.

Comparative Example 1

A 2016 coin battery was manufactured in the same manner as in Example 1, using $LiNi_{0.44}Mn_{1.56}O_4$, which was not surface-treated with PVdF, as a cathode material.

Comparative Example 2

A 2016 coin battery was manufactured in the same manner as in Example 1, except that the amount of PVdF was 5.0 wt %.

Comparative Example 3

A 2016 coin battery was manufactured in the same manner as in Example 1, except that $Al_2O_3$ having a size of 2 μm, instead of magnesium oxide of Example 4, was used.

Experimental Example 1

Initial Charge and Discharge Characteristics

Charge and discharge characteristics of a coin battery manufactured according to each of Examples 1 to 6 and Comparative Examples 1 to 3 were estimated by charging and discharging once at a current of 0.1 C in a voltage range of 3.5 to 4.9 V. Results are summarized in Table 1 below.

TABLE 1

|  | Initial charge capacity (mAh/g) | Initial discharge capacity (mAh/g) | Initial charge and discharge efficiency (%) |
| --- | --- | --- | --- |
| Example 1 | 151.5 | 138.5 | 91.4 |
| Example 2 | 150.5 | 139.2 | 92.5 |
| Example 3 | 151.5 | 137.4 | 90.7 |
| Example 4 | 151.8 | 138.3 | 91.1 |
| Example 5 | 151.4 | 138.5 | 91.5 |
| Example 6 | 150.7 | 138.2 | 91.7 |
| Comparative Example 1 | 150.2 | 136.1 | 90.6 |
| Comparative Example 2 | 149.6 | 127.5 | 85.2 |
| Comparative Example 3 | 142.5 | 129.4 | 90.8 |

As shown in Table 1, it can be confirmed that the batteries manufactured according to Examples 1 to 6 of the present invention exhibit relatively improved initial charge and discharge efficiency, when compared to the batteries manufactured according to Comparative Examples 2 and 3, and the battery manufactured according to Comparative Example 1 exhibits relatively high initial charge/discharge efficiency but low initial charge capacity. The cathode active material manufactured according to each of Examples 1 to 6 of the present invention has a first surface treatment layer and a second surface treatment layer which include fluorine, and, in particular, the fluorine copolymer mainly existing in the second surface treatment layer increases a concentration of lithium ions by electrochemical reaction, and, accordingly, lithium ion migrations on a surface of the lithium-containing metal oxide occurring during charge and discharge may be more easily preformed.

Experimental Example 2

High-Temperature Lifespan Characteristics

Lifespan characteristics of the coin battery manufactured according to each of Examples 1 to 6 and Comparative Examples 1 to 2 were evaluated by charging and discharging 200 times at a current of 1.0 C at 45□. Results are summarized in Table 2 below.

TABLE 2

|  | High-temperature lifespan characteristics $200^{th}/1^{st}$ discharge capacity (%) |
| --- | --- |
| Example 1 | 88.7 |
| Example 2 | 90.5 |
| Example 3 | 91.2 |
| Example 4 | 92.6 |
| Example 5 | 92.4 |

TABLE 2-continued

| | High-temperature lifespan characteristics 200$^{th}$/1$^{st}$ discharge capacity (%) |
|---|---|
| Example 6 | 90.2 |
| Comparative Example 1 | 70.8 |
| Comparative Example 2 | 85.4 |

As shown in Table 2, it can be confirmed that the battery manufactured according to each of Example 1 to 6 of the present invention exhibits relatively superior lifespan characteristics at high-temperature, when compared to the batteries manufactured according to Comparative Examples 1 and 2. The cathode active material of the battery manufactured according to each of Examples 1 to 6 of the present invention has a predetermined surface-treatment layer including fluorine and, as such, side reaction of a cathode active material surface and an electrolyte, and elution of manganese, at high voltage, may be suppressed.

Experimental Example 3

Self Discharge Amount During High-Temperature Storage

The coin battery manufactured according to each of Examples 1 to 6 and Comparatives Example 1 to 2 was charged once at a current of 0.1 C in a voltage range of 3.5 to 4.9 V and then stored for two weeks at 45□. Subsequently, self discharge amount and gas generation amount thereof were evaluated. Results are summarized in Table 3 below.

TABLE 3

| | Self discharge amount (%) | Gas generation amount (ml/g) |
|---|---|---|
| Example 1 | 18.7 | 7.4 |
| Example 2 | 17.4 | 6.2 |
| Example 3 | 15.1 | 6.1 |
| Example 4 | 15.4 | 6.8 |
| Example 5 | 15.8 | 7.1 |
| Example 6 | 15.7 | 6.5 |
| Comparative Example 1 | 29.4 | 18.4 |
| Comparative Example 2 | 24.2 | 5.7 |

As shown in Table 2, it can be confirmed that the battery manufactured according to each of Examples 1 to 6 of the present invention exhibits relatively low self discharge amount and gas generation amount, when compared to the batteries manufactured according to Comparative Examples 1 and 2. The cathode active material of the battery manufactured according to each of Examples 1 to 6 of the present invention has a predetermined surface treatment layer including fluorine and, side reaction of a cathode active material surface and an electrolyte, and elution of manganese, at high voltage, may be suppressed.

Those skilled in the art will appreciate that various modifications, additions and substitutions are possible, without departing from the scope and spirit of the invention as disclosed in the accompanying claims.

INDUSTRIAL APPLICABILITY

As described above, in the present invention, a cathode active material for lithium secondary batteries is surface-treated with a fluorine copolymer and thereby a cathode active material, which has a novel structure, including a first surface treatment layer having a metal oxide layer doped with fluorine and/or a metal hydroxide layer doped with fluorine, and a second surface treatment layer including a fluorine copolymer is provided, and, accordingly, lithium ion movement on a lithium-containing metal oxide surface during charge and discharge may be facilitated.

In particular, it can be confirmed that, when the amount of the fluorine copolymer is less than 5 wt % based on the total weight of the cathode active material, initial charge and discharge characteristics, high-temperature lifespan characteristics and high-temperature storage characteristics may be improved.

In addition, a lithium-containing transition metal oxide according to Formula 1 having a spinel structure may suppress side reaction of a cathode active material surface and an electrolyte, and elution of manganese, at high temperature, when compared to a compound in which some manganese is substituted with a metal element such as Ni or the like, and, as such, a high voltage lithium secondary battery may be provided.

The invention claimed is:

1. A cathode active material for lithium secondary batteries comprising:
    lithium-containing metal oxide particles;
    a first surface treatment layer formed on the surfaces of the lithium-containing metal oxide particles and comprising at least one compound selected from the group consisting of fluorine-doped metal oxides and fluorine-doped metal hydroxides; and
    a second surface treatment layer formed on a surface of the first surface treatment layer and comprising a fluorine copolymer.

2. The cathode active material according to claim 1, wherein the fluorine-doped metal oxide is a fluorine-doped lithium-containing metal oxide generated by substituting some oxygen of the lithium-containing metal oxide with fluorine.

3. The cathode active material according to claim 1, wherein the fluorine-doped metal oxide is generated by substituting some oxygen of an oxide of one metal selected from the group consisting of Al, Mg, Ni, Co, Ti, Cr, Mo, Bi, Zn, Zr, Ru and W with fluorine.

4. The cathode active material according to claim 3, wherein the amount of the fluorine-doped metal oxide is 0.05 wt % or more and less than 2.00 wt % based on the total weight of the cathode active material.

5. The cathode active material according to claim 1, wherein the fluorine-doped metal hydroxide is generated by substituting some hydroxyl groups of an hydroxide of one metal selected from the group consisting of Al, Mg, Ni, Co, Ti, Cr, Mo, Bi, Zn, Zr, Ru and W with fluorine.

6. The cathode active material according to claim 5, wherein the amount of the fluorine-doped metal hydroxide is 0.05 wt % or more and less than 2.00 wt % based on the total weight of the cathode active material.

7. The cathode active material according to claim 1, wherein the fluorine copolymer is at least one selected from the group consisting of polyvinylfluoride, polyvinylidene fluoride, polytetrafluoroethylene, polychlorotrifluoroethylene, perfluoroalkoxy polymer, fluorinated ethylene-propylene, polyethylenetetrafluoroethylene, polyethylenechlorotrifluoroethylene, perfluoroelastomer, fluorocarbon, perfluoropolyether, and perfluorosulfonic acid.

8. The cathode active material according to claim 1, wherein the lithium-containing metal oxide is a lithium transition metal oxide having a layered structure or having a spinel structure.

9. The cathode active material according to claim 8, wherein the lithium transition metal oxide having the spinel structure has a composition represented by Formula 1 below:

$$Li_{1+a}M_xMn_{2-x}O_4 \quad (1)$$

wherein M is at least one selected from the group consisting of Ni, Ti, Co, Al, Cu, Fe, Mg, B, Cr, Zn and Period 5 transition metals; and −0.1≤a≤0.1 and 0.3≤x≤0.8.

10. The cathode active material according to claim 9, wherein the lithium transition metal oxide having the spinel structure has a composition represented by Formula 2 below:

$$Li_{1+a}Ni_bM_cMn_{2-(b+c)}O_4 \quad (2)$$

wherein M is at least one selected from the group consisting of Ti, Co, Al, Cu, Fe, Mg, B, Cr, Zn and Period 5 transition metals; and −0.1≤a≤0.1, 0.3≤b≤0.6, and 0≤c≤0.2.

11. The cathode active material according to claim 1, wherein the first surface treatment layer entirely covers a surface of the lithium-containing metal oxide and the second surface treatment layer entirely covers a surface of the first surface treatment layer.

12. The cathode active material according to claim 1, wherein the first surface treatment layer partially covers a surface of the lithium-containing metal oxide, and the second surface treatment layer partially covers a surface of the lithium-containing metal oxide and entirely covers a surface of the first surface treatment layer.

13. The cathode active material according to claim 1, wherein the fluorine-doped metal oxide and the fluorine-doped metal hydroxide exist on a surface of the lithium-containing metal oxide in a particle form.

14. The cathode active material according to claim 13, wherein an average particle diameter of each of the fluorine-doped metal oxide and the fluorine-doped metal hydroxide particles is 1 nm or more to 1800 nm.

15. The cathode active material according to claim 1, wherein the fluorine copolymer exist in a surface of the first surface treatment layer in a particle form.

16. A cathode for lithium secondary batteries, wherein an electrode mixture layer comprising the cathode active material according to claim 1, a conductive material and a binder is coated on a current collector.

17. A lithium secondary battery comprising the cathode according to claim 16.

18. A battery pack comprising the lithium secondary battery according to claim 17.

19. An electric vehicle using the battery pack according to claim 18 as a power source.

20. A method of preparing the cathode active material according to claim 1, wherein the lithium-containing metal oxide particles are mixed with 0.05 wt % or more and less than 5.00 wt % of the fluorine copolymer based on the total weight of the cathode active material and heat-treated in the atmosphere.

21. The method according to claim 20, wherein 0.05 wt % to 2.00 wt % of metal oxide, metal hydroxide, or a mixture thereof was further mixed based on the total weight of the cathode active material and heat-treated in the atmosphere.

* * * * *